April 16, 1957 R. J. PIPKIN 2,788,699
VISUAL DEVICE FOR TEACHING MUSICAL INSTRUMENTS
Filed Feb. 15, 1954 2 Sheets-Sheet 1

Robert J. Pipkin
INVENTOR.
BY Loyal J. Miller
ATTORNEY

April 16, 1957 R. J. PIPKIN 2,788,699
VISUAL DEVICE FOR TEACHING MUSICAL INSTRUMENTS
Filed Feb. 15, 1954 2 Sheets-Sheet 2
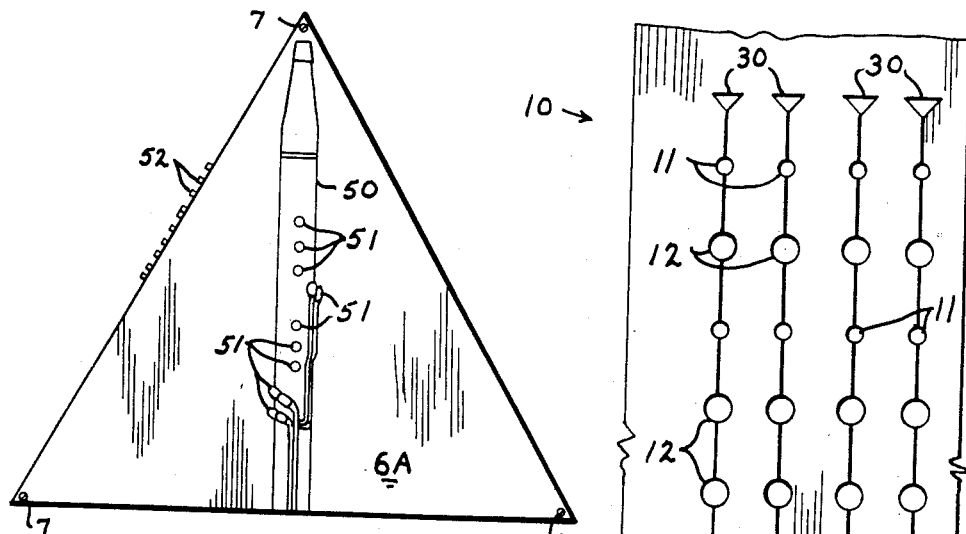
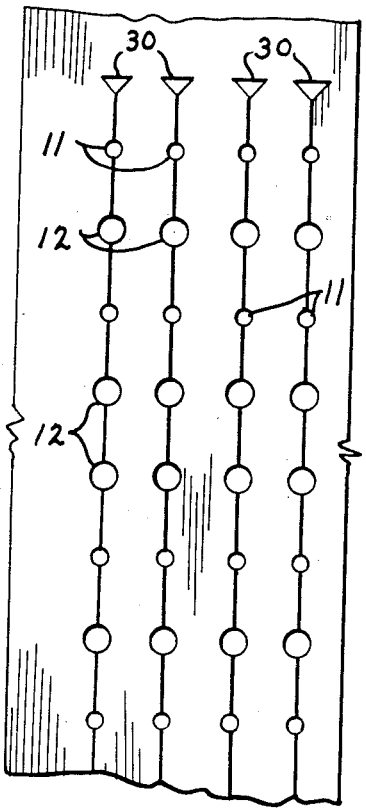
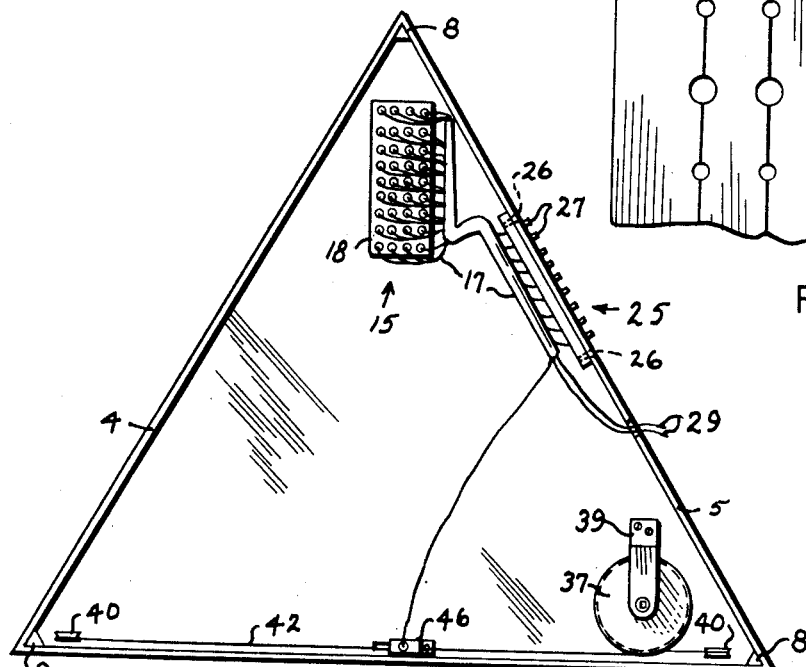
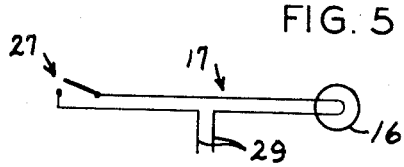
Robert J. Pipkin
INVENTOR.
BY Loyal J. Miller
ATTORNEY

United States Patent Office 2,788,699
Patented Apr. 16, 1957

2,788,699

VISUAL DEVICE FOR TEACHING MUSICAL INSTRUMENTS

Robert J. Pipkin, Oklahoma City, Okla.

Application February 15, 1954, Serial No. 410,308

3 Claims. (Cl. 84—470)

The present invention relates to the art of musical instruction and more particularly to a device for teaching students the proper finger position for sounding a particular musical note on a stringed instrument.

A number of devices and means have been developed for instructing students in the art of piano playing; but no one has produced a device, as far as I have been able to ascertain, for use in instructing students in the matter of playing stringed or wind instruments.

The principal object of this invention is to provide a device for instructing a class-room of students the fundamentals of the sequence of sounding musical notes on the particular instrument being taught.

Another object is to provide a musical instrument instruction device of this class that incorporates a display or diagram of the instrument being taught upon its top, which is arranged in an upright position in full view of the students, and includes novel lighting means behind the top which will flash a light or signal through apertures in the top.

Still another object of this invention is to provide an instruction device of this class which has a control panel to be operated by the instructor.

Another object is to provide a device for musical instruction which combines the visual aspect of the instrument with the touch or feel of the instrument in the student's hand.

An additional object is to provide a device for musical instruction which will aid the instructors teaching methods and increase the interest of the students.

Yet another object is to provide a musical instruction device that may be adapted for the instruction of stringed or wind instruments, which is accomplished by the removal of the top panel of the device and replace it with another top panel having a different musical instrument stenciled thereon.

In carrying out the invention, a triangular cabinet of suitable material is provided and disposed edgewise upon one of its sides with one substantially flat face or top toward the students. The size of the container is great enough to permit the stenciling of a musical instrument upon its face side which may be easily seen from any seat in a conventional class-room. Apertures are placed in the face of the container in selected positions which indicate finger positions for sounding a particular musical note. Novel electric lighting means is disposed behind the apertures connected to a control panel which is located at one side of the device and operated by the instructor.

Other objects will be apparent from the following description when taken in conjunction with the accompanying two sheets of drawings, wherein:

Figure 5 is a back view of the device as shown in Fig. 1, with the back panel removed to more clearly show the working parts therein;

Figure 6 is a schematic view of a typical wiring circuit of the device;

Figure 7 is an enlarged plan view of a portion of the device; and

Figure 8 is a plan view similar to Fig. 1, but showing an alternate embodiment of the device.

Like characters of reference designate like parts in those figures of the drawings in which they occur.

In the drawings:

Figure 3:
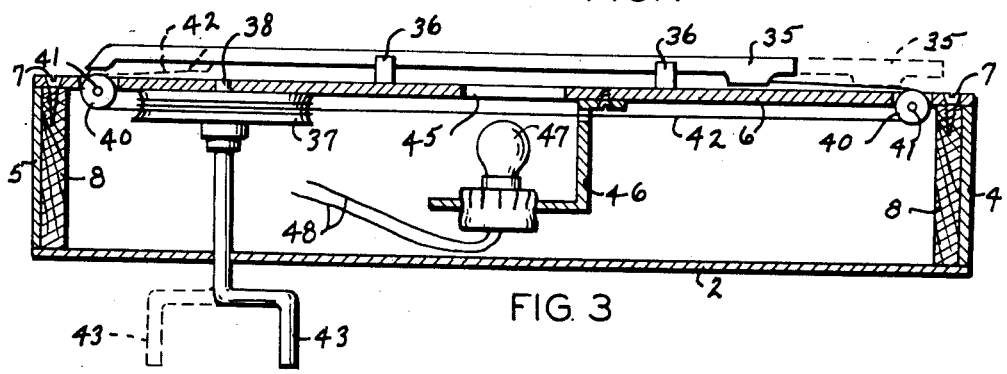
Figure 3 is a horizontal cross-sectional view taken substantially along line 3—3 of Fig. 1.

Reference numeral 1 indicates the device, as a whole, which is a triangular cabinet structure in general configuration having a back panel 2, a bottom 3 and walls 4 and 5, respectively. The bottom 3 and walls 4 and 5 are perpendicularly attached edgewise to the back panel 2 adjacent its side edges forming a hollow cabinet deep enough to house electric lighting means, as more fully explained hereinbelow, and is closed by a removable top panel or face 6. The top 6 is held in place by screws 7 within suitable reinforcing wedge members 8 rigidly attached adjacent each corner of the cabinet (Fig. 3). The top 6, back 2 and walls 4 and 5 are preferably made of some suitable comparatively thin light weight material, but it is desirable that the top 6 be made of a material that is opaque. The cabinet 1 normally rests upon its bottom panel 3.

Figures 1, 2:
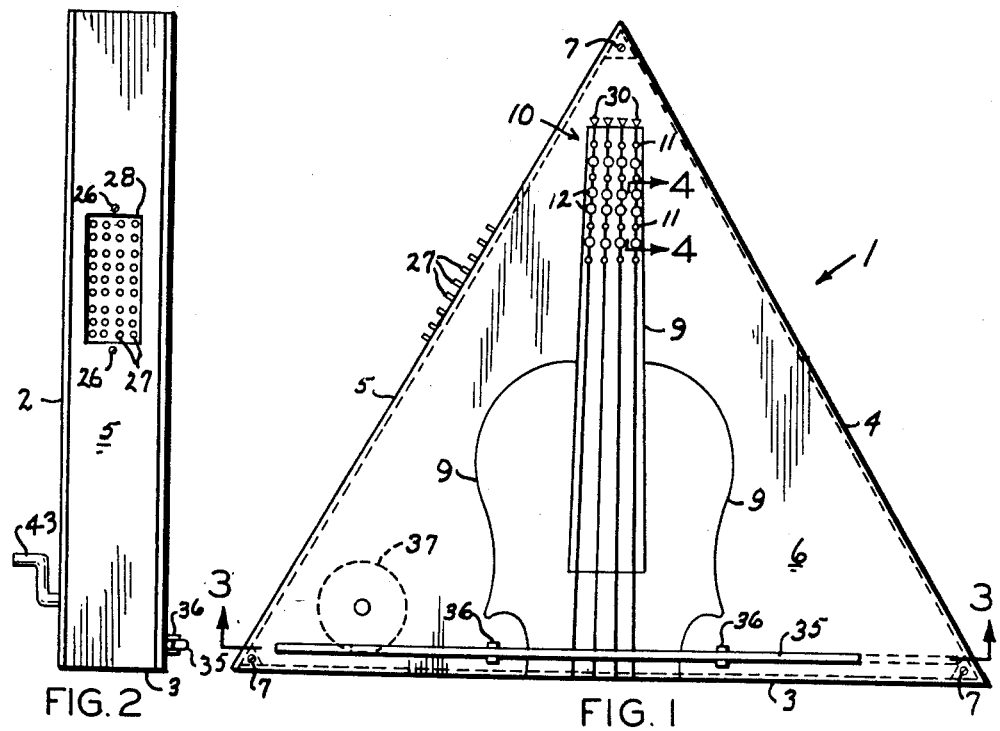
Figure 1 is a plan view of the device.
Figure 2 is a left side view of the device.

Upon the top surface of the top panel 6 is stenciled or drawn substantially the outline of a particular musical instrument, as for example, a violin 9 (Fig. 1). The strings of the violin are drawn bold enough for the students to see them across the class-room and may be made of various colored lines to aid in individually distinguishing them.

Figure 4:
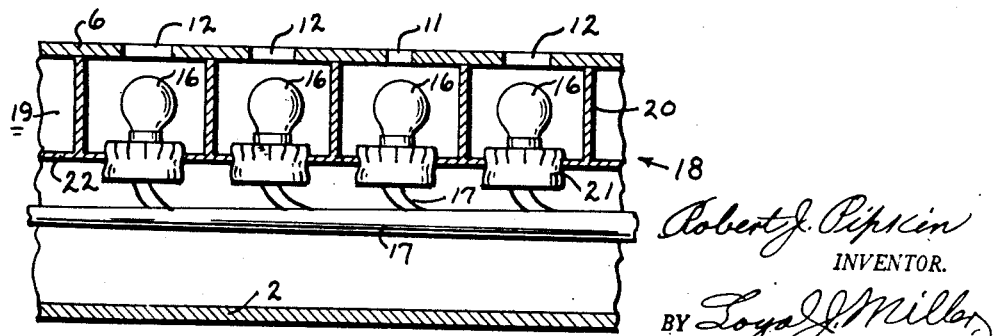
Figure 4 is a vertical cross-sectional view taken substantially along line 4—4 of Fig. 1.

Reference numeral 10 (Fig. 1) indicates, as a whole, a plurality of apertures in the top 6 disposed in spaced relation in rows upon each string, respectively, of the stenciled violin 9, at the proper position for visually indicating the placement of each individual finger for sounding a particular note on the instrument in the student's hand. The large apertures 12 indicate the basic position of the hand or finger pattern most predominately used, and the smaller apertures 11 indicate the secondary or least used finger pattern. Disposed upon the under side of the top 6 adjacent the apertures 10, is electric lighting means 15 connected by wires 29 to a power supply, not shown, in the form of electric bulbs 16 connected by suitable wiring circuits 17 (Fig. 5). The bulbs are held in position behind the apertures 10 by opaque container 18 attached to the under side of the top 6, and which is divided into a plurality of light-tight compartments 19, by longitudinal and transverse partition walls 20 (Fig. 4). One such compartment 19 encloses each aperture, respectively, and at least one bulb 16 is held within each compartment 19 by a conventional socket 21 through the lid 22 of the container 18. Each bulb 16 is operatively connected by the wiring 17 to a control panel 25, fastened to the wall 5 by screws 26. The panel 25 contains a plurality of conventional push-button control members or switches 27 arranged in identically the same positions as the apertures 10. The switches 27 protrude laterally from the wall 5 through an opening 28 (Fig. 2). Schematically illustrated in Fig. 6 is a typical wiring circuit 17 showing the connection of the switch 27 with the bulb 16 to the power supply 29, not shown. Obviously when the instructor pushes a control button 27, and its respective bulb 16 is lighted, it illumines the respective aperture, indicating to the student the correct position for each finger placement. The control buttons 27 are preferably of the push-for-contact, release-for-off type, to enable the instructor to keep the bulb 16 lighted the desired length of time that the student should hold the string of his instrument. At the upper end of each stenciled string, respectively, of the violin, is a triangularly shaped aperture 30 which is equipped with lighting means as hereinabove disclosed for the apertures of the string positions, and when lighted, indicates to the student that that particular string is to be left "open" at that time.

To further aid the instructor in teaching the playing of a violin, an elongated strip of translucent material resembling a violin bow 35 is longitudinally slidably disposed in spaced relation with the top 6, adjacent the bottom 3. The bow 35 is held in slidable spaced relation to the top 6 by a pair of spaced laterally projecting slotted brackets 36, rigidly attached to the top 6 (Fig. 3). A pair of comparatively small pulleys 40 are alignedly disposed within slots through the top 6 adjacent each end, respectively, of the bow 35, and are journaled on pivot pins 41. A suitable pulley 37, having one side disposed flatly adjacent the under side of the top 6 and adjacent the wall 5, is journaled in rotative position by a pin 38 through the top 6 and a bracket 39 (Fig. 5). A soft-laid wire line or suitable cord 42 is wound around the pulley 37 a desired number of times and each end, respectively, passed over the pulleys 40 and attached to each respective end of the bow 35. A crank 43 extends through a perforation in the back panel 2 and operatively connects with the pulley 37 for rotating the same. The instructor may manually slide the bow longitudinally by alternately turning the crank 43 clockwise and then counterclockwise, as shown by the dotted lines in Fig. 3. To further give the illusion of movement, an elongated aperture 45 in the top 6, is centrally and longitudinally disposed with relation to the bow 35. This aperture 45 is equipped with an electric bulb 47 and wiring 48, in a similar manner as disclosed for the apertures 10 and which is held in place by the elongated bracket 46. With this bulb 47 lighted, a beam of light illumines the translucent material of the bow 35 through the aperture 45 as the instructor moves the bow, thus making the movement of the bow more easily seen by the student.

It seems obvious from the foregoing description of the installation of teaching means for a violin, or other orchestral stringed instruments, that the outline of any stringed musical instrument may be stenciled upon the top 6 of the device 1, and suitable apertures 10 arranged with control buttons 27 for the teaching of that particular instrument. Similarly any number of tops 6 so adapted and arranged, may be supplied whereby the instructor may install the desired top in place to teach a desired particular plectrum instrument.

As a further aid in visually instructing in the teaching of stringed musical instruments, a diagram of the stenciled strings of the violin 9 and the apertures 10, may be prepared on paper similar to the view shown in Fig. 7. Such a diagram may be glued or otherwise attached to the finger-board of his instrument to aid the student in locating each correct finger position. The musical notes or symbols may well be lettered upon this sheet or upon the top 6; but they are preferably left off of both since the students must memorize them.

Similarly an alternate embodiment or adaptation of using the top 6 for the teaching of wind musical instruments, is shown in Fig. 8. Substantially the outline of a clarinet 50, or the instrument being taught, is stenciled upon the surface of the top 6A. Apertures 51 are provided, located at the points where the fingers of the student, not shown, must be placed to operate or sound the notes of the wind instrument 50 in a similar manner as disclosed hereinabove for the stringed instruments. Electric lighting and control switches 52 are similarly provided with the bulbs attached to the under side of the top 6A with the control switches on a panel which is attachable to the wall 5 of the cabinet, in the manner described for the panel 18.

*Operation*

The instructor places the cabinet 1 upon its base or bottom 3, within full view of the students, and connects the wiring to a conventional electric outlet or other suitable source of power, not shown. The instructor then flashes an electric signal to the particular aperture 11 or 12 that indicates to the students the proper place to press their finger on the finger-board to sound a desired note. This is accomplished by the instructor pressing the corresponding control switch 27, thus completing or closing an electric circuit for that particular bulb. The length of time it is desired that the string is to be held is indicated by the amount of time the light shines from within the aperture. When the instructor is using the embodiment of the device with the violin top, he may indicate the length of stroke of the violin bow by the rotation of the crank 43 which moves the bow 35, as described hereinabove.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A stringed musical instrument instruction device, including: a triangular cabinet having the outline, substantially, of a stringed musical instrument stenciled upon its removable top, with musical strings stenciled on said top, said top plurally apertured for indicating each finger position for sounding a particular note; a number of complemental individually partitioned-off electrically connected bulbs one each coinciding with a respective aperture and disposed oppositely upon the under side of said top; a translucent bow slidable longitudinally carried by said top adjacent one edge thereof, said bow transversely disposed with relation to said stenciled instrument; said top having an elongated aperture centrally disposed below said bow; an electrically connected bulb carried by the under side of said top adjacent the elongated aperture; a plurality of pulleys carried by the under side of said top adjacent each end, respectively, of said bow; a cord connected to each end, respectively, of said bow and drivably contacting each said pulley; a crank connected to one said pulley for moving said bow in one direction when the pulleys are rotated one way and for moving the bow in the opposite direction when the pulleys are rotated the opposite way; and an electric switch panel carried by one side of said cabinet and operatively connected to said bulbs.

2. A stringed musical instrument instruction device, including: a triangular cabinet having the outline, substantially, of a stringed musical instrument upon its removable top, said top having instrument strings of said musical instrument stenciled thereon, said top plurally apertured for indicating a basic finger pattern for sounding particular notes, said top having a series of smaller apertures spaced substantially intermediate the first mentioned apertures for indicating a secondary fingering pattern; a like plurality of individually partitioned-off electrically connected bulbs coinciding one each, respectively, with both said sets of apertures and carried by the under side of said top; a translucent bow longitudinally and slidably carried by said top parallel with and adjacent one edge thereof, said bow transversely disposed with relation to said stenciled instrument; said top having an elongated aperture centrally disposed longitudinally below said bow; an electrically connected bulb carried by the under side of said top adjacent the elongated aperture; a pulley carried by the under side of said top adjacent each end, respectively, of said bow; a driving pulley carried by the under side of said top intermediate the first said pulleys; a cord connected to each end, respectively, of said bow and drivably contacting each said pulley; a crank connected to said driving pulley for alternately sliding said bow in a forward direction when said driving pulley is rotated in one direction and then in a backward direction to the first said direction when said pulley is rotated in the opposite direction; and an electric switch panel carried by one side of said cabinet and operatively connected to said bulbs.

3. An instruction device for a stringed instrument using a bow, including: a triangular shaped cabinet disposed vertically on its base having a stringed instrument stenciled upon the front of its removable top, said top having an elongated aperture adjacent its base longitudinally disposed transversely of said stenciled instrument; a translucent bow longitudinally and slidably carried by said top parallel with said base adjacent the aperture in said top; a pulley carried by the back of said top adjacent each end, respectively, of said bow; a driving pulley carried by the back of said top intermediate the first said pulleys; a cord connected to each end, respectively, of said bow and drivably contacting each said pulley; a crank connected to said driving pulley for alternately sliding said bow back and forth by clockwise and counterclockwise rotation of the driving pulley; and an electrically connected bulb carried by the back side of said top adjacent the aperture for illuminating said bow.

References Cited in the file of this patent

UNITED STATES PATENTS 2,225,084   Pierce _____ Dec. 17, 1940

FOREIGN PATENTS 686,987   Great Britain _____ Feb. 4, 1953